United States Patent [19]

Suzuki

[11] Patent Number: 5,129,973
[45] Date of Patent: Jul. 14, 1992

[54] MOTORCYCLE TIRE

[75] Inventor: Shigehiko Suzuki, Amagasaki, Japan

[73] Assignee: Sumitomo Rubber Industries, Ltd., Hyogo, Japan

[21] Appl. No.: 552,094

[22] Filed: Jul. 13, 1990

[30] Foreign Application Priority Data

Jul. 20, 1989 [JP] Japan .................................. 1-189231

[51] Int. Cl.$^5$ .............................................. B60C 3/00
[52] U.S. Cl. .................................... 152/454; 152/539; 152/548
[58] Field of Search ......................... 152/454, 539, 548

[56] References Cited

U.S. PATENT DOCUMENTS

| 4,112,994 | 9/1978 | Mills et al. | 152/454 |
| 4,284,116 | 8/1981 | Sato et al. | 152/454 |
| 4,884,610 | 12/1989 | Saito | 152/454 |
| 5,016,697 | 5/1991 | Noma et al. | 152/454 |

FOREIGN PATENT DOCUMENTS

| 0145508 | 8/1983 | Japan | 152/539 |
| 2120179 | 11/1983 | United Kingdom | 152/454 |

Primary Examiner—Michael W. Ball
Assistant Examiner—Nancy T. Krawcyk

[57] ABSTRACT

A motorcycle tire improved in running stability under low pressure service conditions characterized in that:

when the tire is mounted on a regular rim and inflated to 15% of the maximum pressure, the ratio (A/B) of the tire section width (A) measured at the same radial height as the carcass maximum section width point (p) at which the section width of the carcass is maximum to the bead width (B) is not less than 1.90 and not more than 2.20;

a middle portion (C) of the carcass profile defined between a point (W1) and a point (W2) is formed by an arc (Sc) having a curvature of a single radius (Rc) and having a center (o1) inside the tire; and a radially inner portion (U) of the carcass profile defined as extending from the radially inner point (W2) to the bead base region is formed by an arc (Su) having a center (o2) outside the tire and having a curvature of a single radius (Ru) smoothly connected to the above-mentioned arc (Sc) at the point (W2) as a point of inflection therebetween.

1 Claim, 2 Drawing Sheets

MOTORCYCLE TIRE

BACKGROUND OF THE INVENTION

The present invention relates to a pneumatic tire for motorcycles, in which running stability under low pressure service conditions is improved.

In general, when running off the road, motorcycle tires for use both on the road and off the road are inflated to a lower air pressure than the normal air pressure therefor, for example, 0.5 to 0.25 kgf/sq.cm (which is about 10 to 20% of the maximum air pressure), whereby the stiffness of the tread portion is reduced, and contact of the tread face with the ground is increased, and as a result a large road gripping force is obtained.

However, in a conventional motorcycle tire, by decreasing the air pressure, the stiffness of the tire is decreased in the sidewall portions as well as the tread portion, and as a result running stability is lost under low pressure service conditions.

In such a conventional motorcycle tire, as shown in FIG. 2, the carcass has a round profile under a low pressure condition, which profile is almost the same shape as that for the ordinary tires used on the road at a higher pressure (normal pressure). Therefore, when loaded, the sidewall portions m are deformed such that the whole of the sidewall portion m is curved outwards of the tire like an arc. However, the deformation is liable to occur unstably and alternately on the sidewall portions, which greatly deteriorates running stability. Further, as the deformation of the sidewall portions flatten the tread portion n, suppleness of the tread portion is apt to be lost.

Furthermore, the deformation occurs all over the tire as mentioned above, and accordingly it takes a long time to recover from the deformed state to its usual state since the air pressure is low, which also deteriorates the running stability.

It is therefore, an object of the present invention to provide a low pressure motorcycle tire in which running stability is improved by arranging the tire shape more particularly by arranging the carcass profile under a not fully inflated condition.

According to one aspect of the present invention, a low pressure motorcycle tire has a pair of bead portions, a tread portion, and a pair of sidewall portions, and the tire comprises a bead core disposed in each bead portion, and a carcass extending between the bead portions and secured to the bead cores, and the ratio (A/B) of the tire section width (A) to the bead width (B) when the tire is mounted on a regular rim and inflated to 15% of the maximum pressure is not less than 1.90 and not more than 2.20, wherein the tire section width (A) is measured at the same radial height as the carcass maximum section width point (p) in the tire sidewall portions at which the section width of the carcass is maximum.

Therefore, axially outward swelling of the sidewall portion is increased more than the conventional tire sidewall, and the sidewall shape under low pressure conditions becomes similar to it loaded shape, that is, the difference between the loaded shape and free shape becomes small, and deformation occurs stably on both the sidewall portions, and the amount of deformation is less. As a result, running stability is improved while the tire stiffness is maintained in both the vertical direction and lateral direction.

However, if the A/B ratio is more than 2.20, the amount of swelling is excessive, and the vertical stiffness has a tendency to decrease, and further, tire performances at the normal pressure such as wear resistance and cut resistance of the tread are sacrificed. On the other hand, when the A/B ratio is less than 1.90, the lateral stiffness is decreased and running stability is lost.

Further, the carcass profile is preferably arranged as follows:

a middle portion (C) of the carcass profile defined between a point (W1) and a point (W2) is formed by an arc (Sc) having a curvature of a single radius (Rc) and having a center (o1) inside the tire;

the point (W1) is located radially outside the above-mentioned carcass maximum section width point (p);

the point (W2) is located radially inside the carcass maximum section width point (p);

the radial distance (L2) between the points (W2) and (p) is more than 1.0 times and not more than 1.2 times the radial distance (L1) between the points (W1) and (p);

the radial distance (L) between the points (W1) and (W2) is not less than 0.4 times and not more than 0.6 times the radial height (H) of the carcass measured from the bead base (b) to a point (a) on the tire equator; and the radial distance (L3) measured from the bead base (b) to the above-mentioned radially inner point (W2) is not less than 0.15 and not more than 0.35 times the above-mentioned radial height (H) of the carcass.

Accordingly, the curved middle portions of the carcass induce stable bending deformation in the sidewall portions and restrict the deformation in a narrow region whereby the recovering time is shortened. Further, the middle portions help the increase in the vertical stiffness of the tire under both a low pressure and the normal pressure.

Furthermore, a radially inner portion (U) of the carcass profile defined as extending from the radially inner point (W2) to the bead base region is preferably formed by an arc (Su) having a center (o2) outside the tire and having a curvature of a single radius (Ru) smoothly connected to the above-mentioned arc (Sc) of the middle portion (C) at the point (W2) as a point of inflection therebetween.

Therefore, the inner portion of the carcass forwards the occurrence of the above-mentioned stable deformation of the sidewall and increases the lateral stiffness of the tire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described in detail with reference to the drawings, which are given by way of illustration only, and thus are not limitative of the present invention, and in which.

DETAILED DESCRIPTION OF THE PREFERRED EMBODIMENTS

Figure 1:
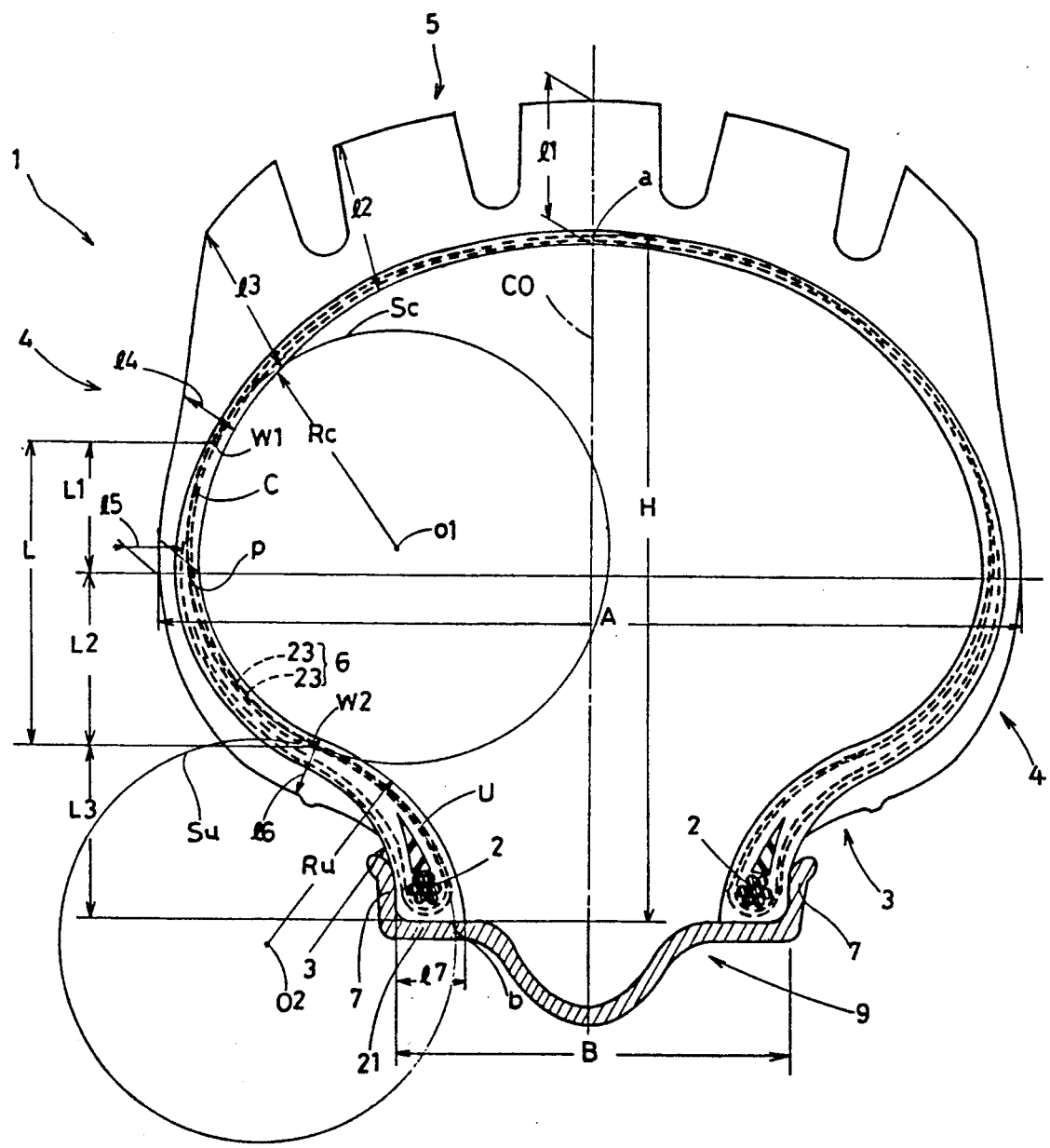
FIG. 1 is a cross sectional view showing an embodiment of the present invention.

In FIG. 1, a low pressure motorcycle tire 1 according to the present invention is 4.00R18 4PR in size, and mounted on a regular rim 9 of size 2.15×18 and inflated to 15% of the maximum pressure.

Incidentally, the maximum air pressure in this tire size is 2.25 kgf/sq.cm, and the tire is not fully inflated at the 15% pressure. The carcass profile at the 15% pressure is B different from the fully inflated profile but is B almost the same as the molded profile.

The tire 1 has a tread portion 5, a pair of bead portions 3 and sidewall portions 4, and the tire comprises a pair of bead cores 2 disposed one in each bead portion and a carcass 6 extending between the bead portions through the sidewall portions and the tread portion.

The rim 9 is a center drip rim having a tire mounting well in the center thereof, and a pair of bead seats 21 for the tire bead portions 3 are formed one on each side of the well, and from the axially outer edge of each bead seat a rim flange 7 extends radially outwardly along the outside of the tire bead portion.

The carcass 6 comprises at least one ply 23 of cords laid at an angle of 30 to 90 degrees to the tire equator CO and turned up around the bead axially from the inside to the outside thereof to be secured thereto.

For the carcass ply cord, organic fiber cords such as nylon, polyester, rayon and the like are preferably used, but steel cords may be used.

In this example, the carcass 6 is composed of two radial piles 23 in which the cords are laid at about 80 degrees to the tire equator in the same direction in each ply but in opposite directions with respect tot he tire equator between the adjacent plies.

Further, the tread portion 5 has no belt structure to increase the rigidity of the tread portion. Thus, the tire 1 in this embodiment is a beltless radial tire.

According to the present invention, the ratio A/B of the maximum tire section width A when the tire is mounted on the regular rim 9 and inflated to 15% of the maximum pressure, to the bead width B must be set to be not less than 1.90 and not more than 2.20.

Here, the maximum tire section width A is measured in the tire sidewall region at the same radial height as the maximum carcass section width point p at which the carcass section width is maximum, and the bead width B is corresponding to the rim width of the rim 9 measured between the rim flanges 7.

Further, in this embodiment, the carcass shape or profile when the tire is mounted on the regular rim 9 and inflated to 15% of the maximum pressure, is arranged as follows:

a middle portion (C) of the carcass profile defined between a radially outward point (W1) and an inward point (W2) is formed by an arc (Sc), where the outward point (W1) is located radially outside the above-mentioned carcass maximum section width point (p), and the inward point (W2) is located radially inside the carcass maximum section width point (p);

the arc (Sc) has a curvature of a single radius (Rc) and the center (o1) thereof is positioned inside the tire and radially outward of the carcass maximum section width point (p) and further on the same side of the tire equator (CO);

the radial distance (L2) between the inward point (W2) and the carcass maximum section width point (p) is set in the range of from 1.0 to 1.2 times the radial distance (L1) between the outward point (W1) and the point (p);

the radial distance (L) between the outward and inward points (W1) and (W2) is set in the range of from 0.4 to 0.6 times the radial height (H) of the carcass measured from the bead base (b) to a point (a) on the tire equator; and the radial distance (L3) measured from the bead base (b) to the inward point (W2) is set in the range of from 0.15 to 0.35 times the above-mentioned radial height (H) of the carcass.

Furthermore, a radially inner portion (U) of the above-mentioned carcass profile extending from the inward point (W2) to the bead base region is formed by an arc (Su) having a center (o2) which is positioned outside the tire and radially inward of the bead base (b).

The arc (Su) has a curvature of a single radius (Ru) and the arc is smoothly connected to the above-mentioned arc (Sc) of the meddle portion (C) at the inward point (W2) as a point of inflection, and the radius (Ru) is not larger than the radius (Rc).

COMPARISON TEST

Figure 2:
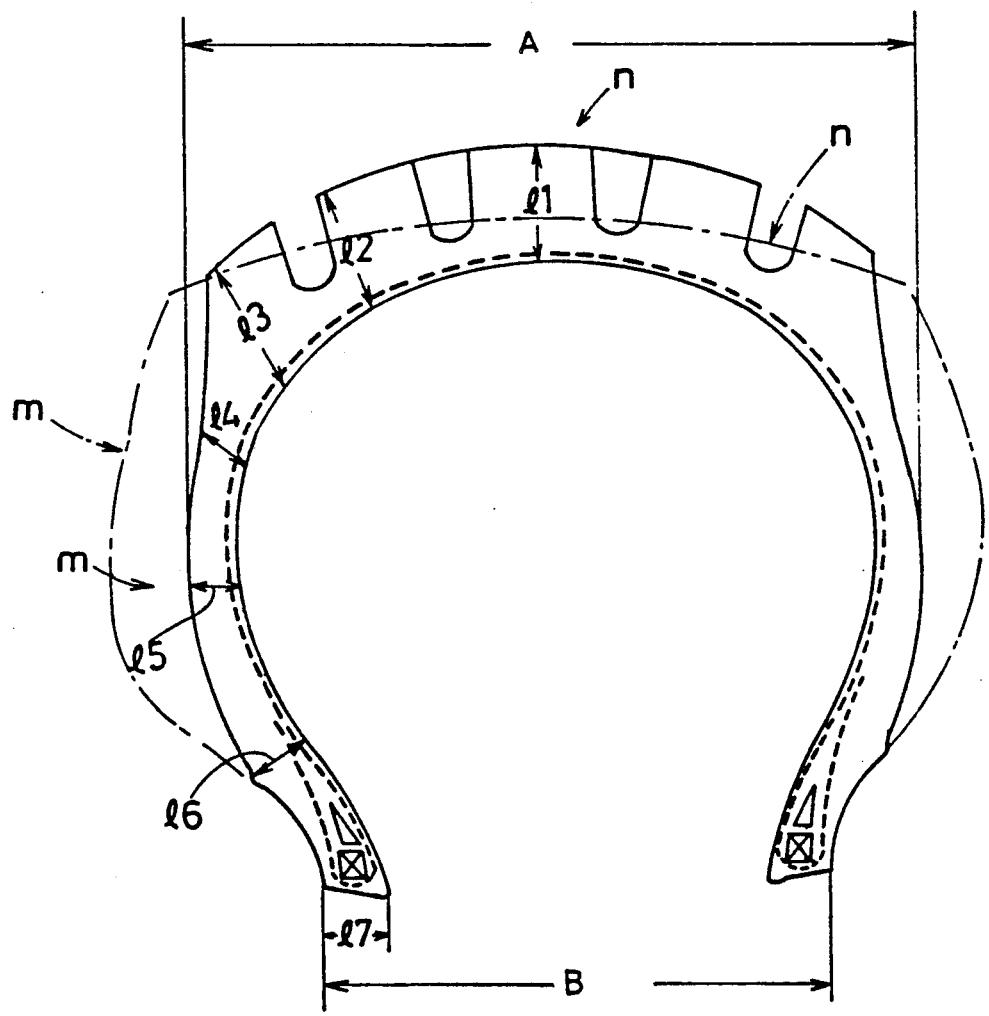
FIG. 2 is a cross sectional view showing the conventional tire.

Test tires of size 4.00R18 4PR including working example tires (Ex.1 & 2) and reference tires (Ref.1 & 2) each having the structure shown in FIG. 1 but partly modified in size and reference tire 3 according to the prior art shown in FIG. 2 were made, and their vertical spring coefficients and lateral spring coefficients were measured, and further in order to evaluate the running stability of each tire, feeling tests by a skilled test driver were made.

The test results, together with the specifications of the test tires, are given in Table 1. In the Table 1, the test results and the spring coefficients are indicated by an index based on the assumption that the reference tire 3 is 100, where the larger index is better.

As described above, in a motorcycle tire according to the present invention, the carcass profile under low pressure conditions which is similar to the molded profile is formed in a specific shape to reduce the difference from the loaded shape. Therefore, the amount of sidewall deformation when loaded under low pressure conditions is decreased on both the vertical and lateral directions, and as a result, the vertical and lateral stiffness of the tire is improved while keeping suppleness in the tread portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| | Ex. 1 | Ex. 2 | Ref. 1 | Ref. 2 | Ref. 3 |
| --- | --- | --- | --- | --- | --- |
| Tire | | | | | |
| TEST RESULTS** | | | | | |
| Running stability (110)* | 120 | 120 | 110 | 108 | 100 |

TABLE 1-continued

|  | Ex. 1 | Ex. 2 | Ref. 1 | Ref. 2 | Ref. 3 |
| --- | --- | --- | --- | --- | --- |
| Vertical Spring Coefficient (120)* | 120 | 122 | 108 | 110 | 100 |
| Lateral Spring Coefficient (105)* | 110 | 108 | 103 | 103 | 100 |
| Section width A (mm) | 121 | 105 | 100 | 127 | 102 |
| Bead width B (mm) | 55 | 55 | 55 | 55 | 82 |
| Ratio A/B | 2.20 | 1.9 | 1.8 | 2.3 | 1.24 |
| Carcass | 2 plies | 2 plies | 2 plies | 2 plies | 2 plies |
| Cord material | Polyester 1000d/2 | Polyester 1000d/2 | Polyester 1000d/2 | Polyester 1000d/2 | Polyester 1000d/2 |
| Cord angle (deg) | 78 | 78 | 78 | 78 | 78 |
| Height H (mm) | 88 | 88 | 88 | 88 | 97 |
| Distance |  |  |  |  |  |
| L1 (mm) | 18 | 18 | 18 | 18 |  |
| L2 (mm) | 22 | 18 | 23 | 22 |  |
| L3 (mm) | 23 | 21 | 22 | 23 |  |
| L = L1 + L2 (mm) | 40 | 36 | 41 | 40 |  |
| Ratio |  |  |  |  |  |
| L/H | 0.46 | 0.41 | 0.47 | 0.46 |  |
| L3/H | 0.26 | 0.24 | 0.25 | 0.26 |  |
| Radius |  |  |  |  |  |
| Rc (mm) | 27 | 27 | 27 | 27 |  |
| Ru (mm) | 27 | 20 | 25 | 25 |  |
| Belt | non | non | non | non | non |
| Tire thickness (mm)*** |  |  |  |  |  |
| L1 tread center | 18.0 | 18.0 | 18.0 | 18.0 | 18.0 |
| L2 tread shoulder | 19.5 | 19.5 | 19.5 | 19.5 | 19.5 |
| L3 tread edge | 20.0 | 20.0 | 20.0 | 20.0 | 20.0 |
| L4 | 7.0 | 7.0 | 7.0 | 7.0 | 7.0 |
| L5 max. width point | 5.0 | 5.0 | 5.0 | 5.0 | 5.0 |
| L6 | 7.5 | 7.5 | 7.5 | 7.5 | 7.5 |
| L7 bead base | 7.5 | 7.5 | 7.5 | 7.5 | 7.5 |

*The numbers in parentheses show the standards.
**Air pressure: 0.3 kg/sq. cm
***References, L1-L7 correspond to those in FIGS. 1 & 2.

I claim:
1. A low pressure motorcycle tire comprising:
a pair of bead cores disposed one in each bead portion of the tire; and
a carcass extending between the bead portions and secured to the bead cores, said carcass laid at an angle of 30 to 90 degrees with respect to the tire equator,
when the tire is mounted on a rim and inflated to 15% maximum pressure therefor, the ratio (A/B) of a tire section width (A) measured at a radial height of the carcass maximum section width point (p) at which the section width of the carcass is maximum to the bead width (B) being 1.90 to 2.20, and the carcass being provided with the following profile comprising,
a radially outer portion (C) defined between a radially outer point (W1) and a radially inner point (W2), and
a radially inner portion (U) extending from said radially inner point (W2) to the bead base region,
said radially outer point (W1) and radially inner point (W2) being located radially outward and radially inward of said carcass maximum section width point (p), respectively,
the radial distance (L3) of said radially inner point (W2) from the bead base line being 0.15 and 0.35 times the carcass section height (H),
the radial distance (L) of said radially outer point (W1) from said radially inner point (W2) being 0.4 to 0.6 times the carcass section height (H),
the radial distance (L2) between said radially inner point (W2) and said carcass maximum section width point (p) being more than 1.0 times and not more than 1.2 times the radial distance (L1) between said radially outer point (W1) and said carcass maximum section width point (p),
said radially outer portion (C) being formed by a single radius arc having a center inside the tire,
said radially inner portion (U) being formed by a single radius arc having a center outside the tire and being smoothly connected to the arc of said radially outer portion (C), and
the radius (Ru) of said radially inner portion being not more than the radius (Rc) of said radially outer portion.

* * * * *